(12) United States Patent
Ono

(10) Patent No.: US 12,406,460 B2
(45) Date of Patent: Sep. 2, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Michihiko Ono, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 18/155,243

(22) Filed: Jan. 17, 2023

(65) Prior Publication Data
US 2023/0252753 A1 Aug. 10, 2023

(30) Foreign Application Priority Data

Feb. 10, 2022 (JP) .................. 2022-019591

(51) Int. Cl.
G06V 10/25 (2022.01)
G06T 7/70 (2017.01)
G06V 20/52 (2022.01)
G06V 40/10 (2022.01)
G06V 40/20 (2022.01)

(52) U.S. Cl.
CPC ................ *G06V 10/25* (2022.01); *G06T 7/70* (2017.01); *G06V 20/52* (2022.01); *G06V 40/10* (2022.01); *G06V 40/20* (2022.01); G06T 2207/30196 (2013.01); G06T 2207/30232 (2013.01)

(58) Field of Classification Search
None
See application file for complete search history.

(56) References Cited

U.S. PATENT DOCUMENTS 10,909,365 B2 2/2021 Ono

FOREIGN PATENT DOCUMENTS

JP 2009284167 A * 12/2009
JP 2016-057908 A 4/2016
JP 2017076171 A * 4/2017

(Continued)

OTHER PUBLICATIONS

Sep. 17, 2024 Japanese Official Action in Japanese Patent Appln. No. 2022-019591.

(Continued)

*Primary Examiner* — Delomia L Gilliard
(74) *Attorney, Agent, or Firm* — Venable LLP

(57) ABSTRACT

An image processing apparatus comprising a subject detection unit that detects a plurality of subjects from a captured image; an independence detection unit that detects an independent subject from the detected subjects, wherein the independent subject includes a subject for which other subjects are not present in a predetermined range; a measurement unit that measures residence times for the detected subject; a determination unit that determines a degree of priority for the subject such that the degree of priority becomes higher for the subject that is independent and have relatively long residence times, based on detection results from the independence detection unit, and measurement results from the measurement unit; and an image processing unit that performs predetermined image processing on the subjects up to a predetermined upper limit for the number of subjects in order from the highest degree of priority.

13 Claims, 12 Drawing Sheets

(56) References Cited

FOREIGN PATENT DOCUMENTS

JP         2021117768 A  *  8/2021
WO         2013/121711 A      8/2013
WO      WO-2013121711 A1 *  8/2013   ......... G06K 9/00221

OTHER PUBLICATIONS

Feb. 4, 2025 Japanese Official Action in Japanese Patent Appln. No. 2022-019591.

* cited by examiner

FIG. 7

| ID | RESIDENCE TIME | INDEPENDENT STATE | POSE ESTIMATION SUBJECT |
|---|---|---|---|
| 123 | 45 SECONDS | NOT INDEPENDENT | SUBJECT |
| 124 | 30 SECONDS | INDEPENDENT | SUBJECT |
| 125 | 10 SECONDS | INDEPENDENT | SUBJECT |
| 126 | 10 SECONDS | NOT INDEPENDENT | NON-SUBJECT |

IMAGE PROCESSING APPARATUS, IMAGE PROCESSING METHOD, AND STORAGE MEDIUM

BACKGROUND OF THE INVENTION

Field of the Invention

The present invention relates to (1) an image processing apparatus configured to detect a subject, (2) an image processing method, and (3) a storage medium.

Description of Related Art

In recent years, damages due to shoplifting have become more serious in various facilities such as small retailers and large-scale business locations, and there is a need on the side of the retailers who would like to reduce these damages. In regard to such needs, there is a technology that detects suspicious movements that are suspected of being shoplifting by analyzing a video image that has been captured by a surveillance camera in real time, and that prevents shoplifting before it happens by alerting the staff and security personnel of the store of the detection results.

For example, in Japanese Unexamined Patent Application, First Publication No. 2017-076171, feature values such as the position, orientation, line of sight, and the like of people are extracted from video image data that was captured by a camera, and people who are suspected of shoplifting are detected by analyzing these feature values. In the case in which a person who is suspected of shoplifting is detected, the staff and security personnel for the store are alerted, and shoplifting can be prevented by the staff and security personnel approaching the subject person.

In contrast, Japanese Unexamined Patent Application, First Publication No. 2016-057908 discloses a method in which, when a person who is suspected of shoplifting is detected, an audio notification that prompts the customer to pay is performed by an audio playback device.

In the case of systems that perform actions such as notifying staff or audio playback toward the customer based on analysis results for video image data that was captured by the camera, as in the methods that have been listed as the related art, processing in real time is necessary. This is due to the possibility that if the video image analysis and action are not performed in real time, the shoplifting suspect will already have moved away when the action is performed.

In contrast, in business establishments that require shoplifting prevention systems, it is preferable that the system can be introduced at a low cost. In particular, in small-scale retail locations, it is difficult to introduce expensive video image analysis devices (dedicated server devices) for shoplifting prevention, and therefore, a low-cost system that operates on a generic PC is desirable.

In this context, FIG. 11 and FIG. 12 will be used to explain the problems in the related art. FIG. 11 is a diagram showing one example of a camera image inside of a store, and customers 1102 to 1104 are present in a captured image 1101. FIG. 12 is a diagram showing one example of processing for a general shoplifting prevention system, and upon inputting an image, first, the people in the image are detected by person detection processing 1201.

In the image in FIG. 11, 3 people, the customers 1102 to 1104, are detected. Next, action analysis processing 1202 is performed on each of the people, and whether or not a person performing a suspicious action that is suspected to be shoplifting is present among the three people of the customers 1102 to 1104 is detected.

Note that in action analysis, generally consecutive image frames are input. However, in this context the explanation thereof is omitted. In the case in which a person performing a suspicious action is detected by the action analysis processing 1202, an alert to the staff, or the playback of an audio message to the suspicious person and the like is performed by action processing 1203.

In the above example, for example, the action analysis processing for the people (subjects), is performed for each person (subject) in the image, and therefore, when the number of people (subjects) in the image increases, the necessary calculation amounts for the action analysis processing also increase proportionally.

If such a system is made to operate on, for example, a low-cost generic PC, the time that is needed for the action analysis processing increases along with increases in people (subjects), and there is a concern that the responsiveness will be degraded. Such problems also occur in in the same manner in the case in which sick livestock are detected from among a large number of livestock or the like, and during abnormal operation checks for manufactured products and the like.

In this context, one object of the present invention is to provide an image processing system in which it is difficult for the responsiveness to be degraded even if the subjects increase.

SUMMARY OF THE INVENTION

In order to achieve the above-described object, an image processing apparatus in one aspect of the present invention comprises at least one processer or circuit configured to function as: a subject detection unit configured to detect a plurality of subjects from an image that has been captured; an independence detection unit configured to detect an independent subject from among the plurality of subjects that have been detected by the subject detection unit, wherein the independent subject includes a subject for which other subjects are not present in a predetermined range of the subject; a measurement unit configured to measure a residence time of the subject that have been detected by the subject detection unit; a determination unit configured to determine a degree of priority for the plurality of subjects such that the degree of priority becomes higher for the subject that is independent and have relatively long residence times, based on results of a detection by the independence detection unit and measurement results that have been measured by the measurement unit; and an image processing unit configured to perform predetermined image processing on the subjects up to a predetermined upper limit for the number of subjects in order from those with a high degree of priority.

Further features of the present invention will become apparent from the following description of embodiments with reference to the attached drawings.

BRIEF DESCRIPTION OF THE DRAWINGS

FIG. 7 is a diagram showing results in which three people have been determined as pose estimation subjects from among the four people with IDs 123 to 126 in the present embodiment.

DETAILED DESCRIPTION OF THE INVENTION

Hereinafter, with reference to the accompanying drawings, favorable modes of the present invention will be described using Embodiments. In each diagram, the same reference numbers are applied to the same members or elements, and duplicate descriptions will be omitted or simplified.

In addition, although people are used as the subjects in the following example, the image processing in the present invention is not limited to the use of people as subjects, and the subjects may also be, for example, any type of living thing such as livestock or the like, or the image processing may also be used for operational checks for subjects such as manufactured products or the like.

Embodiment

Figure 1:
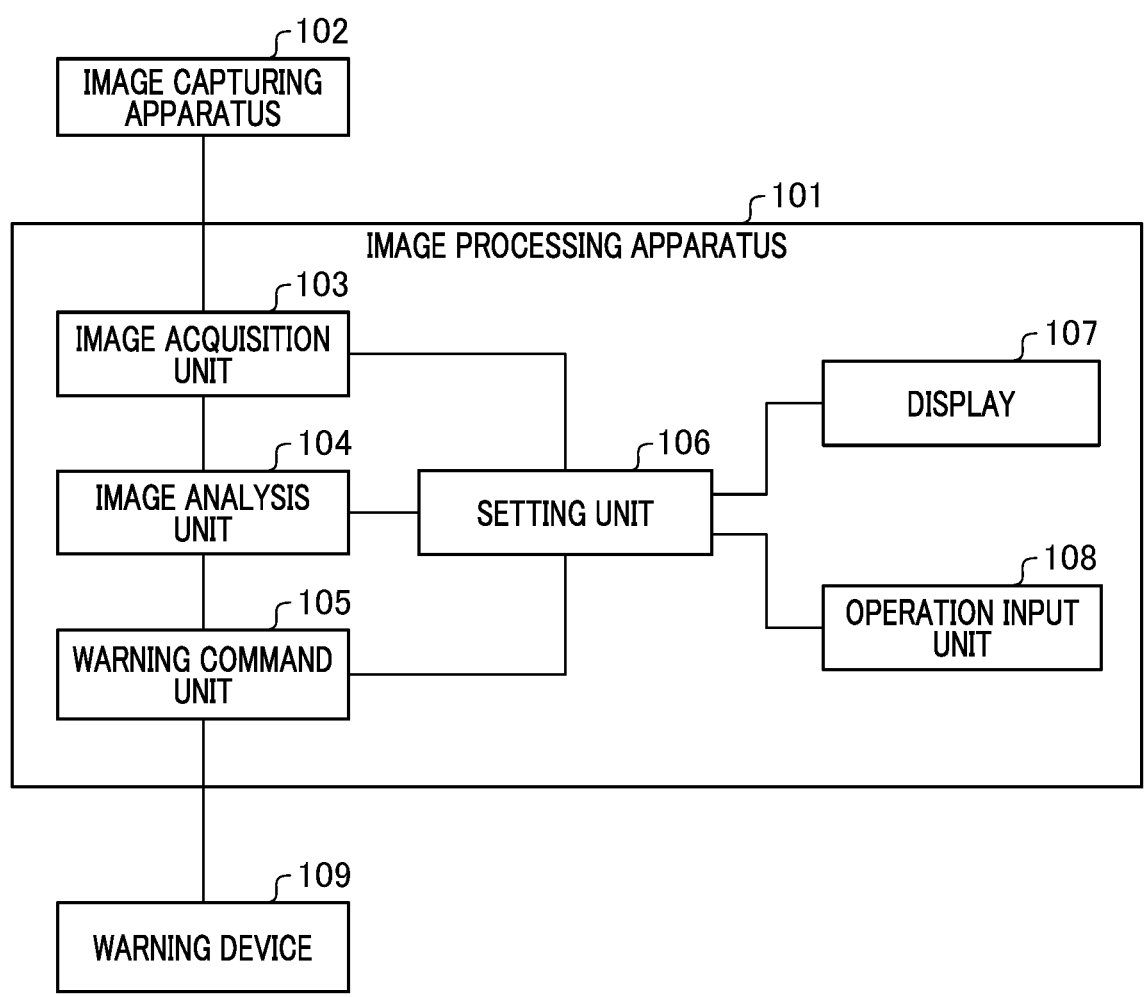
FIG. 1 is a functional block diagram showing an example of a configuration of an image processing apparatus according to an embodiment of the present invention.

FIG. 1 is a functional block diagram showing an example of a configuration of an image processing apparatus according to an embodiment of the present invention. Note that a portion of the functional blocks shown in FIG. 1 are realized by a CPU serving as a computer that is included in the image processing apparatus executing a computer program that has been stored on a memory serving as a storage medium. However, the processing may also be made such that a portion or the entirety thereof is realized using hardware.

An application specific integrated circuit (ASIC), a processor (a reconfigurable processor, a DSP), or the like can be used as the hardware. In addition, each of the functional blocks that are shown in FIG. 1 do not need to be stored in the same housing, and they may also be configured by separate devices that are connected to each other via signal paths.

The image processing apparatus 101 has an image acquisition unit 103 for acquiring video image data from an image capturing apparatus 102 via, for example, a wired or wireless network, and an image analysis unit 104 configured to detect people from the video image data and to detect people who perform suspicious actions.

In addition, the image processing apparatus 101 also has a warning command unit 105 that issues a command, a setting unit 106 that sets each type of operation of the image processing apparatus 101, a display 107 that displays the processing state of the image processing apparatus 101, and an operation input unit 108 on which the user performs operations. 109 is a warning device that is connected to the peripheral of, for example the image capturing apparatus 102, which is external to the image processing apparatus 101, via a wired or wireless network, and generates a warning based on a command from the warning command unit.

A user can set the image analysis unit 104 and the warning command unit 105 by operating the operation input unit 108 while looking at the display on the display 107. The image processing apparatus 101 receives video image data captured by the image capturing apparatus 102 via the image acquisition unit 103.

In this context, although the image acquisition unit 103 directly acquires video images from the image capturing apparatus, it may also indirectly acquire video images via an intermediate device. In addition, although in this example, the image capturing apparatus 102 is configured to be external to the image processing apparatus 101, the image processing apparatus 101 itself may also have an image capturing unit serving as an image acquisition unit.

In the present embodiment, an example will be explained that uses a network camera to serve as the image capturing apparatus 102. The video image data that has been received from the image capturing apparatus 102 is displayed on the display 107 when the settings are changed by the user, or the like. In addition, the video image data that has been received is used in order for the image analysis unit 104 to detect people who perform suspicious actions.

The processing flow for the image analysis unit 104 will be explained below. Upon detecting a suspicious action, the warning command unit 105 transmits a command to emit a warning to the warning device 109 that has been connected externally to the image processing apparatus 101.

Figure 2:
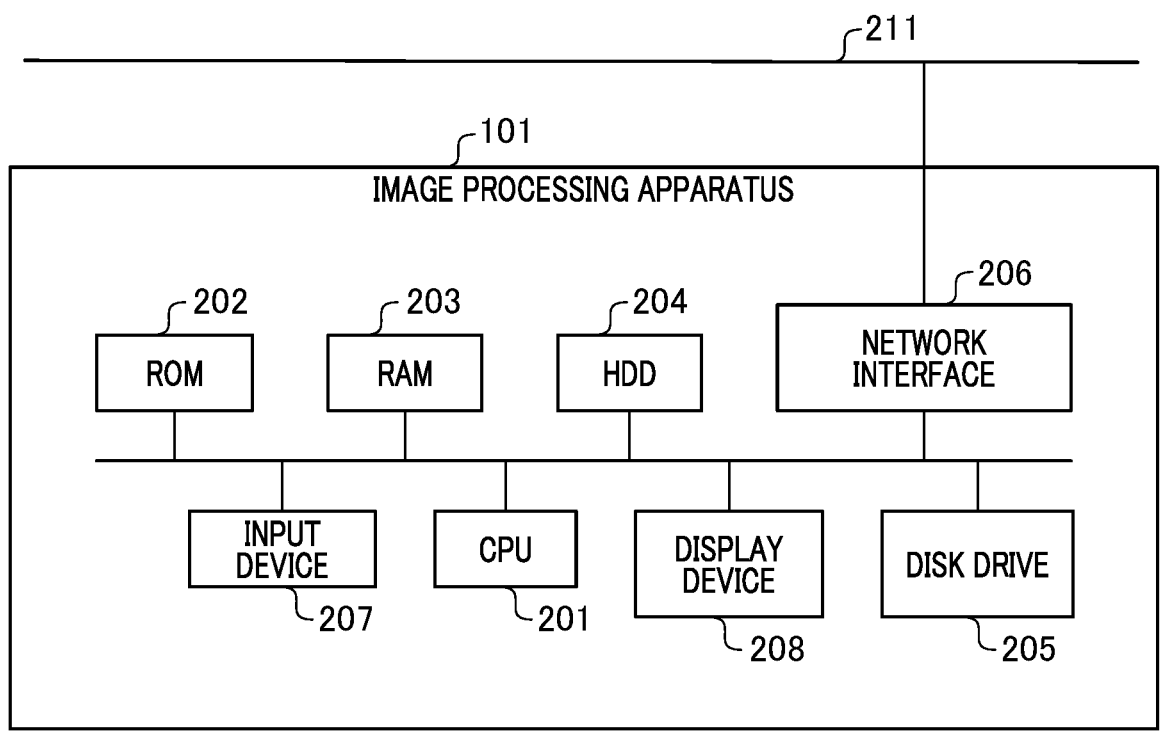
FIG. 2 is a diagram showing a hardware configuration example of the image processing apparatus according to the present embodiment.

FIG. 2 is a diagram showing an example of a hardware configuration of the image processing apparatus according to the present embodiment. The image processing apparatus 101 has a CPU 201, a ROM 202, a RAM 203, a hard disk drive (HDD) 204, an external disk drive 205, a network interface 206, an input device 207, and a display device 208. The external disk drive 205 has a detachable CD, DVD, Blu-ray Disc, flexible disk, or the like.

The network interface 206 is connected to a wired or wireless network 211. The CPU 201 functions as a computer, and is a control device that integrally controls the image processing apparatus 101. The ROM 202 stores a computer program by which the CPU 201 controls the image processing apparatus 101.

Note that a secondary storage device may also be provided instead of the ROM 202. The RAM 203 decompresses the program that the CPU 201 has read out from the ROM 202, and is a memory for executing processing. In addition, the RAM 203 may also serve as a temporary storage memory and also be used as a storage region for temporarily storing the data for the subjects of each type of processing.

The HDD 204 stores image files and the like. The CPU 201 inputs image files from the HDD 204. Note that in the case in which the CPU 201 inputs image files from the external disk drive 205 or the network interface 206, the HDD 204 may not be necessary.

The external disk drive 205 reads out image files from the detachable CD, DVD, Blu-ray Disc, or flexible disk, and the CPU 201 inputs image files via the external disk drive 205.

Note that in the case in which the CPU 201 inputs image files from the HDD 204 or the network interface 206, the external disk drive 205 may not be necessary. The network interface 206 is a circuit that performs communications via the network 211.

The CPU 201 is also able to input image files via the network 211. In addition, the CPU 201 is configured so as to acquire images from the image capturing apparatus 102 via the wired or wireless network 211.

In the case in which the CPU 201 inputs image files from the HDD 204 or the external disk drive 205, the network interface 206 may not be necessary. The display device 208 includes a liquid crystal display or the like that displays images and region boxes. The input device 207 includes keyboards for inputting numerical values, pointing devices, a mouse, a touch panel, or the like for indicating the display position of the display region for the display device 208.

As was described above, the hardware configuration for the image capturing apparatus 101 has the same hardware configurational elements as the hardware configurational elements with which a general PC (personal computer) is equipped. Therefore, each type of function that is realized by the image processing apparatus 101 can be implemented as software that functions on a PC.

The image processing apparatus 101 is able to realize each type of function of the image processing apparatus by the CPU 201 executing a program. Below, the figures will be used to explain a detection method for a suspicious person using the image analysis unit 104 according to the present embodiment.

Figure 3:
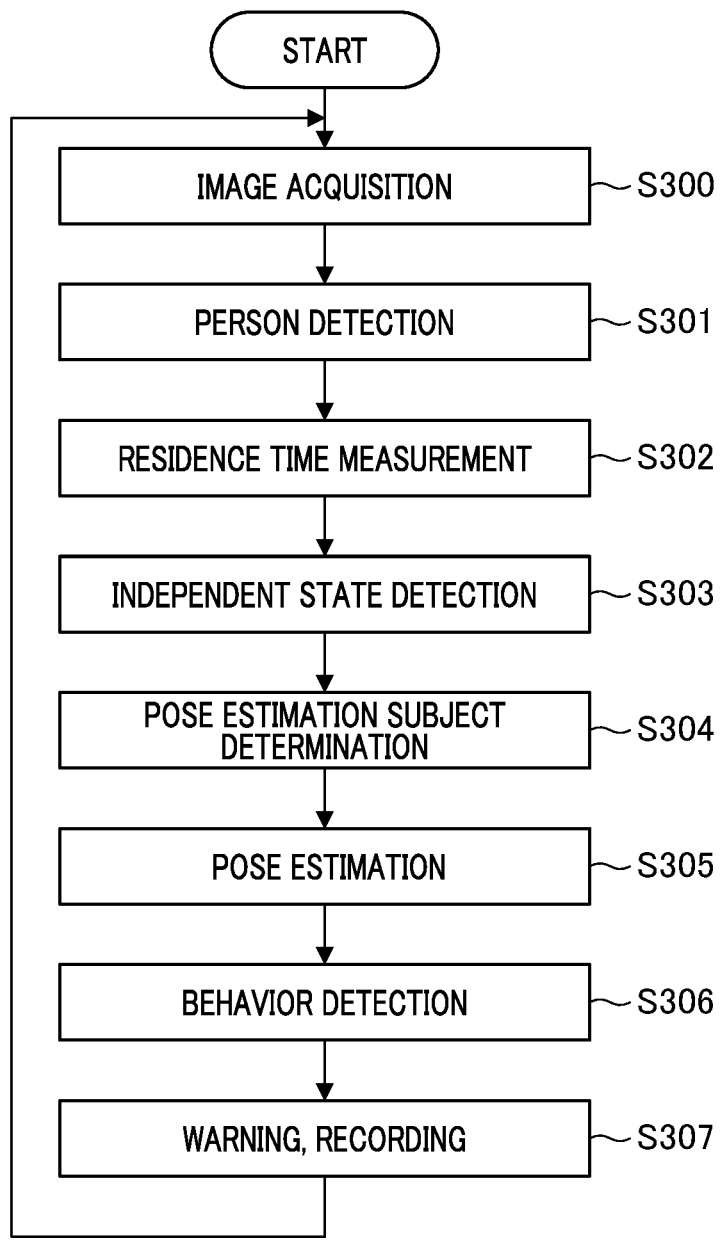
FIG. 3 is a flowchart showing the processing flow for an image analysis unit according to the present embodiment.

FIG. 3 is a flowchart showing the processing flow of the image analysis unit according to the present embodiment. Note that the operations for each step in the flowchart in FIG. 3 are performed by the CPU that serves as a computer inside the image processing apparatus executing a computer program that has been stored on a memory.

The flow in FIG. 3 begins upon the image analysis mode for the image processing apparatus being turned on, and the image analysis unit 104 sequentially processes continuous image frames that have been received from the network camera according to this flow.

In step S300, the image analysis unit 104 acquires images from, for example, the image capturing apparatus 102. Next, in step S301, the image analysis unit 104 executes person detection processing, and detects the people within the image.

Figure 4A:
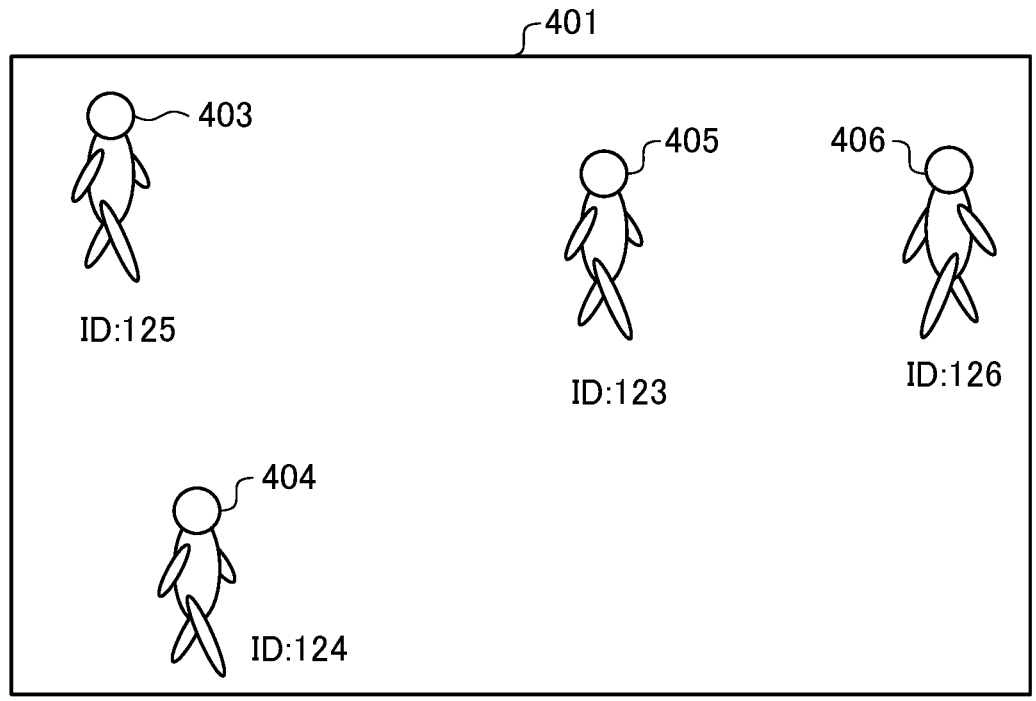
FIGS. 4A and 4B are diagrams showing one example of person detection results according to the present embodiment.
Figure 4B:
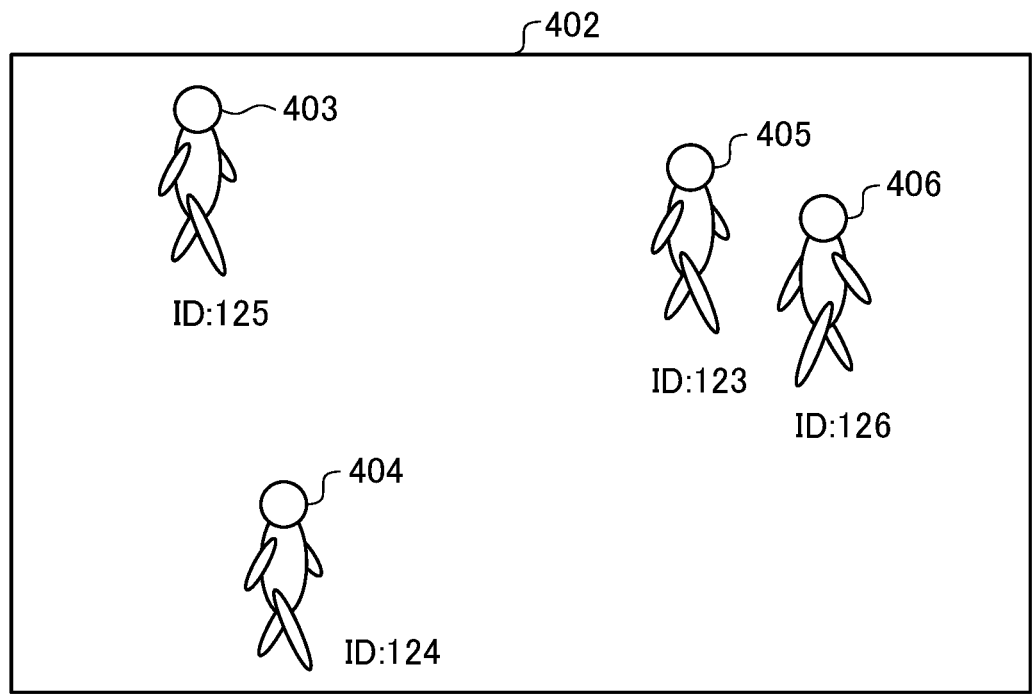

FIGS. 4A and 4B are diagrams showing an example of person detection results according to the present embodiment, and as is shown in FIGS. 4A and 4B, during the person detection processing, people are identified by sequential analysis of consecutive image frames, each person is assigned an ID, and is then tracked between frames.

In methods for tracking persons between continuous frames by assigning them IDS, methods that use the variation amount for the position of a person, and methods that use feature amounts such as the hair style and clothing style of a person are standard. Note that this step S301 functions as a subject detection step for detecting a plurality of people from continuous image frames (a subject detection unit).

FIG. 4A shows an $n^{th}$ image frame 401, and FIG. 4B shows an $n^{th}$+1 image frame 402. In FIGS. 4A and 4B, the persons 403 to 406 are detected, the persons are linked (associated) between frames based on their positions and displacement amounts, and are assigned IDs.

Next, in step S302, the residence time measurement processing for each person that was detected in step S301 is performed by the image analysis unit 104. That is, step S302 functions as a measurement step (measurement unit) that measures the residence time for each person that serves as a subject, and residence time measurement processing that measures the residence time for that person is performed as a displacement state measurement step (displacement state measurement unit) in the present embodiment.

In the present embodiment, residence time is defined as a the time during which a subject continues to be continuously present in an image. Therefore, as in FIG. 5, the time period during which the people for each ID were present in the image is measured using the tracking ID that was assigned during the person detection processing in step S301.

Figure 5:
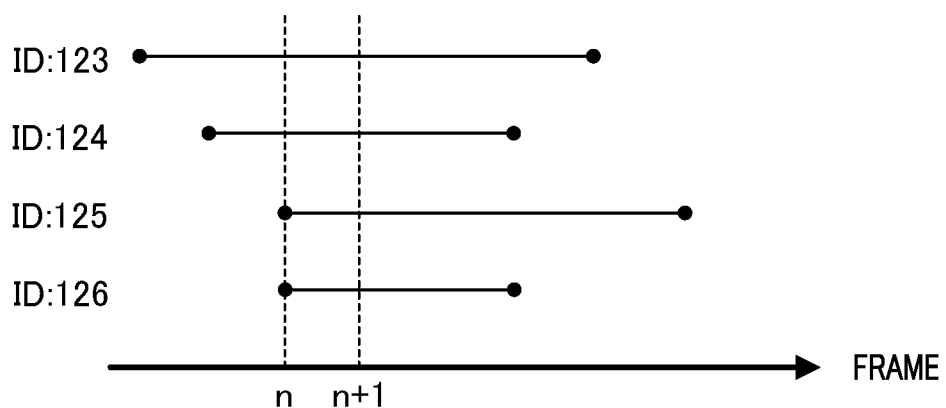
FIG. 5 is a diagram showing one example of residence time measurement according to the present embodiment.

FIG. 5 is a diagram showing one example of residence time measurement according to the present embodiment. In the example in FIG. 5, the person with the ID 125 has been present since the $n^{th}$ frame, and therefore, in the case in which the image frame interval (image frame time period) is 200 milliseconds, the residence time for the person with the ID 125 is 200 milliseconds in the $n^{th}$+1 frame.

Next, in step S303, the image analysis unit 104 performs independent state detection processing for each person that was detected. During the independent state detection processing, the distance between the people who have been detected in the image is calculated by comparing each of the coordinates for the plurality of persons, and performing difference calculations.

Figure 6A:
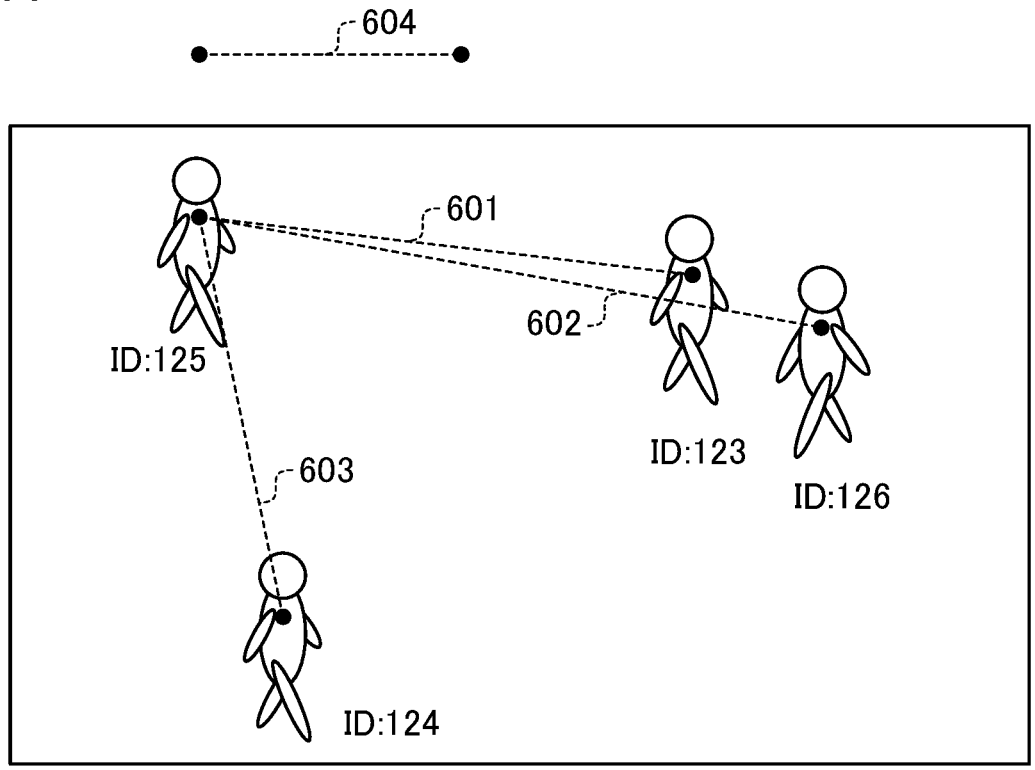
FIGS. 6A and 6B are diagrams showing one example of independent state detection according to the present embodiment.
Figure 6B:
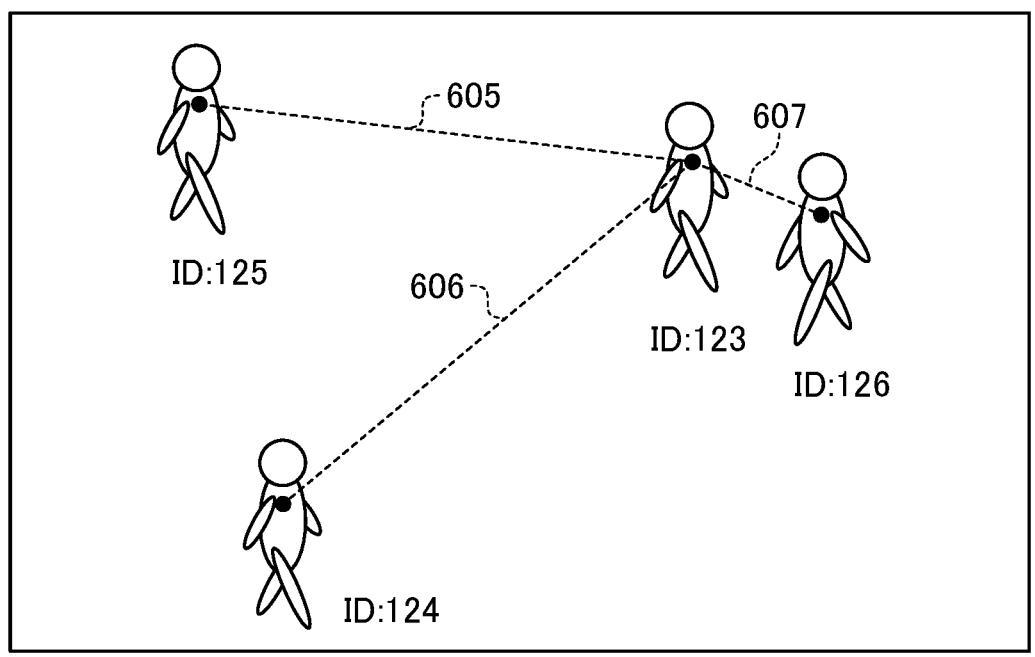

FIGS. 6A and 6B are diagrams showing one example of an independent state detection according to the present embodiment, and FIG. 6A shows one example of independent state detection processing for the person with the ID 125 in the $n^{th}$+1 frame.

First, during the independent state detection processing for the person with the ID 125, the detection coordinates for the person with the ID 125 are made the reference point, and each of the distances (601 to 603) until the detection coordinates for the three people with the IDs 123, 126, and 124 in the image are calculated.

In the case in which a person is present with a distance that is smaller than a predetermined threshold 604 from among these distances, it is determined that the person who is the reference point is "not independent". Conversely, in the case in which all of these distances are larger than the predetermined threshold 604, it is determined that the person who is the reference point is "independent".

In this manner, step S303 functions as an independence detection step (independence detection unit) that detects subjects who are independent from among the people who serve as the plurality of subjects. Note that independent subjects include subjects for whom there are no other subjects present in a predetermined range for this subject.

As is shown in FIG. 6A, in the example in which the person with the ID 125 has been made the reference point, each of the distances 601 to 603 are all larger than the predetermined threshold 604, and therefore, it is determined that the person with the ID 125 is independent. Note that although the distance that is the threshold is realized as a numerical value serving as a pixel distance, in FIG. 6A, the threshold 604 is shown as a line segment for convenience.

In addition, FIG. 6B is a diagram showing an example of independent state detection processing for the person with the ID 123, and the detection coordinates for the person with the ID 123 are made the reference point, and each of the distances (605 to 607) in the image until the detection coordinates for the three people with the IDs 125, 124, and 126 are calculated.

In this example, although the distance 605 and the distance 606 are larger than the threshold 604, the distance 607 is smaller than the threshold. That is, it is determined that the person with the ID 123 and the person with the ID 126 are close to each other, and it is determined that the person with the ID 123 is not independent.

Such processing is performed with each of the people who have been detected as the reference point, and the independent state for each person is detected. Note that although in the present embodiment subjects are classified into two independent or not independent states using a threshold, they may also be classified into further detailed states using two or more thresholds. In addition, a score representing the degree of independence based on each distance may be calculated, and this may be treated as an independent state score for that person.

Next, in step S304, the image analysis unit 104 performs pose estimation subject determination processing based on the residence time measurement results and the independent state detection results for each person that was detected. In this context, step S304 functions as a determination step (determination unit) that determines a degree of priority for the plurality of persons according to at least one of results of a comparison by a coordinate comparison unit, and a displacement state that has been measured by a displacement state measurement unit.

That is, during the determination step, the degree of priority for the plurality of subjects is determined based on the results of the detection by the independence detection unit and the measurement results that have been measured by the measurement unit such that the degree of priority becomes higher for subjects that are independent and have relatively long residence times. Note that in this case, the degree of priority is determined such that the degree of priority is higher for the independent subjects that have been detected by the independence detection unit than the degree of priority for the non-independent subjects.

In addition, the degree of priority is determined such that from among the independent subjects, the degree of priority becomes higher for the independent subjects with relatively long residence times, and the degree of priority is determined such that from among the non-independent subjects, the degree of priority is higher for non-independent subjects who have relatively long residence times.

In the present embodiment, an example is shown in which at most 3 people are determined as pose estimation subjects from among the people who are present in the image. FIG. 7 is a diagram showing the results in which 3 people are determined as pose estimation subjects from among the four people with the IDs 123 to 126 in the present embodiment.

In the present embodiment, first, independent people are prioritized as the pose estimation subjects, and next, in the case in which a plurality of people who are in the same independent state are present, those who have long residence times are prioritized as the pose estimation subjects.

In the example in FIG. 7, from among the four people, the person with the ID 124, and the person with the ID 125 are in an independent state. From among these two people, the person with the ID 124 has a longer residence time, and therefore, first, the person with the ID 124 is prioritized and made the pose estimation subject, and next the person with the ID 125 is made a pose estimation subject.

Next, with respect to the two people who are not independent, the person with the ID 123 and the person with the ID 126, the person with the ID 123, who has a long residence time, is prioritized, and made the pose estimation subject. At this point in time, the upper limit for the number of people being 3 people has been reached, and therefore, the person with the ID 126 becomes a non-subject for the pose estimation processing. In addition, in the present embodiment, image processing such as, for example, a predetermined display, predetermined pose estimation processing, or the like is performed for the people with relatively high degrees of priority up until the predetermined upper limit for the number of people.

In the above-explained example, an example has been shown in which the pose estimation subjects are limited to at most three people based on the residence time measurement results and the independent state detection results. Such a method for assigning degrees of priority is based on the premise that many suspicious persons, such as shoplifters or the like, are independent, or that many have a long residence time.

Note that in the present embodiment, as was explained above, first the coordinates of each of the plurality of people is compared, and the independent people are prioritized as the pose estimation subjects, and next, in the case in which a plurality of people are present who are in the same independent state, those who have a longe residence times will be prioritized as the pose estimation subjects.

Therefore, the independent state detection from step S303 may also be performed before the residence time measurement from step S302 in FIG. 3, and the residence time measurement by step S302 may also be performed on the people who have been determined to be independent.

In addition, the processing may also be made such that it is determined whether or not the amount of people who have been determined to be independent have reached the upper limit for the number of people, and in the case of Yes, the residence time measurement by step S302 is performed on the people who have been determined as not being independent.

In addition, the method for assigning the degree of priority, and the maximum number of people are not limited thereto. For example, it is also possible to prioritize the people who are present just before/are present in a coordinate range that is a blind spot for the staff (including the coordinate position), or the people who are closest to this range based on the coordinates for the people who have been detected. In addition, the coordinates of the warning device such as a speaker or like in the image may be registered in advance, and a method that assigns priority to the person whose detection coordinates are the closest to the warning device may be used.

That is, the coordinates of each of the plurality of people may be compared, then based on the results of this comparison, a person who is present in a predetermined range of coordinates (including the coordinate position) or the person closest thereto may be detected and the degree of priority for this person may be made high. That is, the independence detection unit may also detect a subject that is present in a predetermined range of coordinates, or the subject who is closest thereto as an independent subject.

Note that when the pose estimation subjects are being determined, it is also possible to refer to the pose estimation subject determination results from past image frames.

Figure 8:
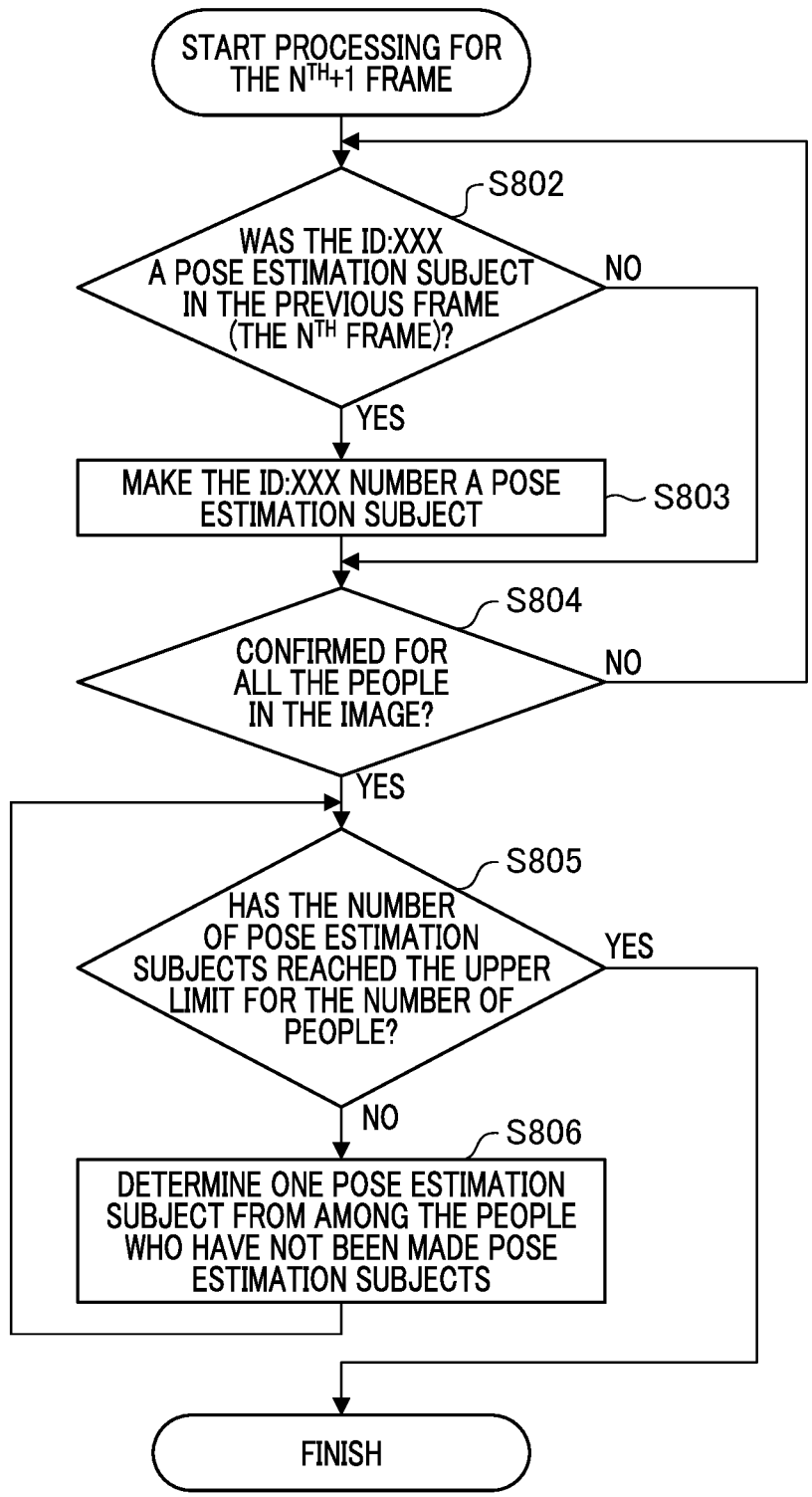
FIG. 8 is a flowchart showing an example of processing contents for pose estimation processing subject determination in step S304 in the present embodiment.

FIG. 8 is a flowchart showing an example of processing contents for the pose estimation processing subject determination in step S304 in the present embodiment. Note that the processes for each step in the flow chart in FIG. 8 are performed by the CPU serving as the computer inside of the image processing apparatus executing a computer program that has been stored on a memory.

FIG. 8 shows the flow for a case in which a person who was a pose estimation subject in the $n^{th}$ frame is also unconditionally made a pose estimation subject in the $n^{th}+1$ frame. In step S802 to step S804 in FIG. 8, the image analysis unit 104 confirms whether or not all of the people who are present in the current image frame (the $n^{th}+1$ frame) were pose estimation subjects in the previous frame (the $n^{th}$ frame).

That is, step S802 determines whether or not a person with a predetermined ID was a pose estimation subject in the previous frame (the $n^{th}$ frame), and if this is No, the process proceeds to step S804, and if this is Yes, the process proceeds to step S804 with the person having this ID as a pose estimation subject in step S803. Then, the process returns to step S801, and the confirmation process is repeated until confirmation is completed for all of people who have IDs in the image.

That is, in step S802 to step S804, the new degree of priority for the current frame is determined by referring to the past degree of priority history (for example, from one frame before). Note that instead of referring to the degree of priority from just one frame before, the degree of priority in a plurality of frames just before may also be referenced. In addition, instead of determining the degree of priority in the current frame by referring a past degree of priority, the processing may also be made such that the degree of priority is made high for people for whom a predetermined behavior was detected in the past.

Following this, in step S805, the image analysis unit 104 determines if the pose estimation subjects in the current frame have reached the upper limit for the number of people (or if there are any people who are not pose estimation subjects), and in the case of Yes, the pose estimation subject determination processing is completed. In the case in which the upper limit for the number of people has not been reached, during the step S806, based on the conditions described above, the image analysis unit 104 adds one person to the people who are pose estimation processing subjects from among the people who are not pose estimation processing subjects.

Following this, the processing returns to step S805 again, and determines if the number of people who are pose estimation subjects has reached the upper limit for the number of people (or if there are any people who are not pose estimation subjects), and if this is Yes, the flow in FIG. 8 is completed.

By introducing such a flow, people who were determined to be pose estimation subjects once will continue to be pose estimation subjects until they are no longer present in the image. Note that although this flow makes people who were pose estimation subjects in the previous frame pose estimation subjects in the current frame unconditionally, the method for referring to the results of the past image frames is not limited hereto.

For example, the processing may also be made such that a determination is made with respect to a person who was made a pose estimation subject in the previous frame after weighing the residence time measurement results and the independent state detection results in the current frame.

That is, it may also be made easier to determine the independent state of a person who was made a pose estimation subject in the previous frame by, for example, making their residence time in the current frame longer by a predetermined ratio, or by increasing the distance between them and the other people by a predetermined ratio. Conversely, the processing may also be made such that the threshold for determining whether or not a person is in an independent state is lowered by a predetermined ratio.

As above, in step S305, as is shown in FIG. 8, the image analysis unit 104 executes pose estimation processing on the people that have been determined by the pose estimation subject determining processing (step S2304 in FIG. 3).

Although generally, there is a bottom-up system and a top-down system as the systems for pose estimation, the present embodiment performs, for example, the top-down system.

Figure 9:
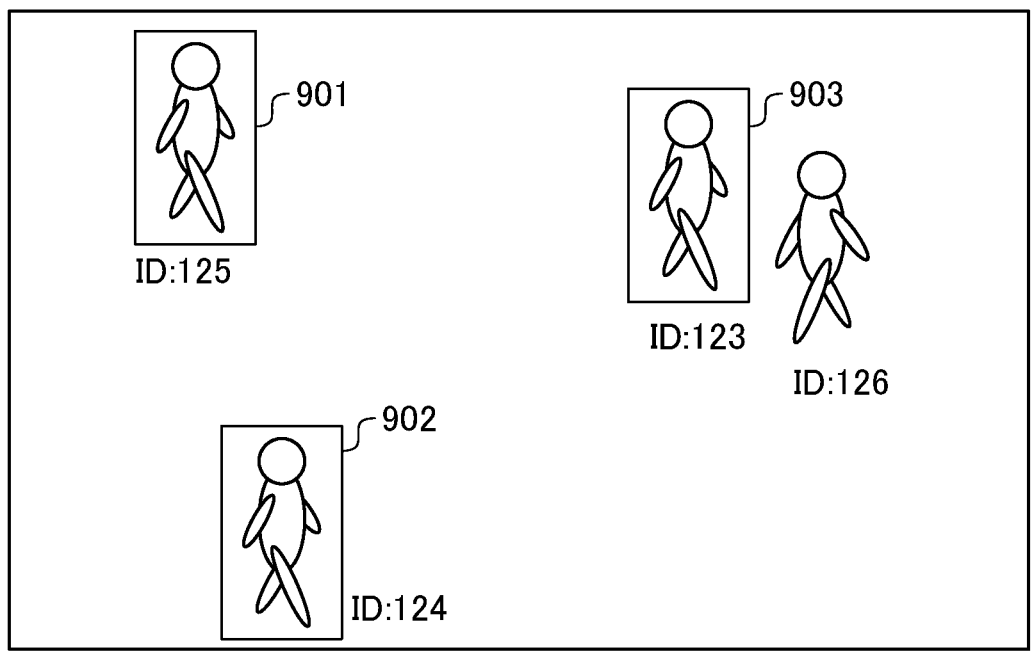
FIG. 9 is a diagram showing an example of image extraction for the pose estimation processing according to the present embodiment.

FIG. 9 is a diagram showing an example of image extraction for the pose estimation processing according to the present embodiment. As is shown in FIG. 9, frame display processing is performed so as to frame each of the people in order to display the person detection regions 901 to 903 for the three pose estimation subjects by differentiating them from the other people who are not pose estimation subjects.

Then, pose estimation processing is performed by extracting the images from within those frames. In this manner, step S305 functions as an image processing step (an image processing unit) configured to perform predetermined image processing such as frame display processing, pose estimation processing, and the like for people up to a predetermined upper limit for the number of people in order from those with a high degree of priority, for example, only during a predetermined time period.

Note that the display processing for displaying the display state for the people with a comparatively high degree of priority by differentiating them from other people may also be, for example, display processing such that displays a mark in the vicinity of the display state for the people with relatively high degrees of priority, that changes the color of the frames for the other people, or that causes the frame to flash.

That is, this may also include display processing for displaying subjects by differentiating them from the other subjects up until the predetermined upper limit for the number of people in order from those with a high degree of priority. In addition, a predetermined frame may also be displayed by the display processing on the subjects until the predetermined upper limit for the number of people in order from those with a high degree of priority. This may also include pose estimation processing that estimates the poses of the subjects until the predetermined upper limit for the number of people in order from those with a high degree of priority.

Figure 10:
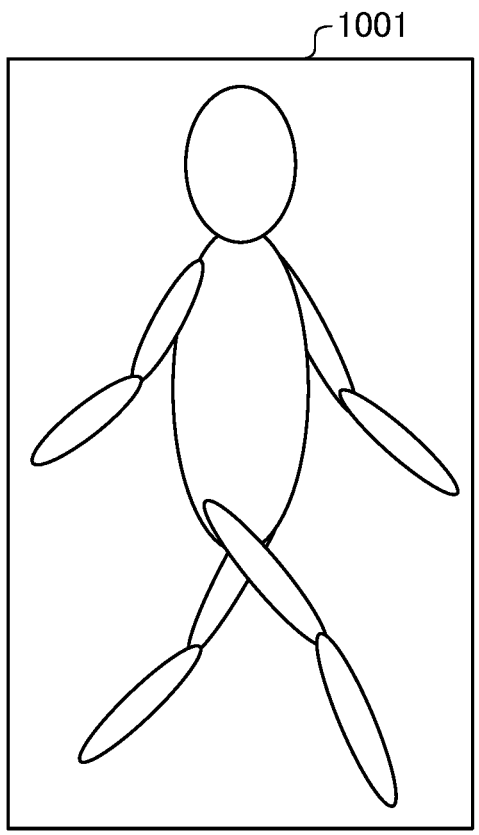
FIG. 10 is a diagram showing one example of pose estimation processing results according to the present embodiment.
Figure 10:
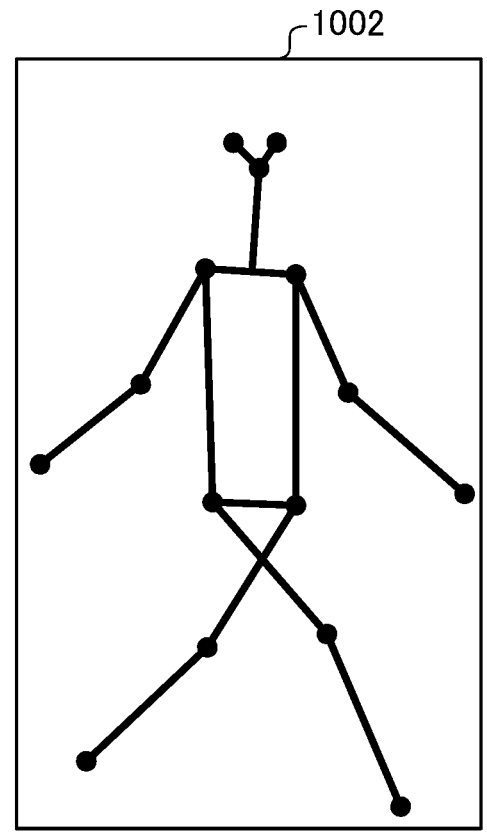
Figure 11:
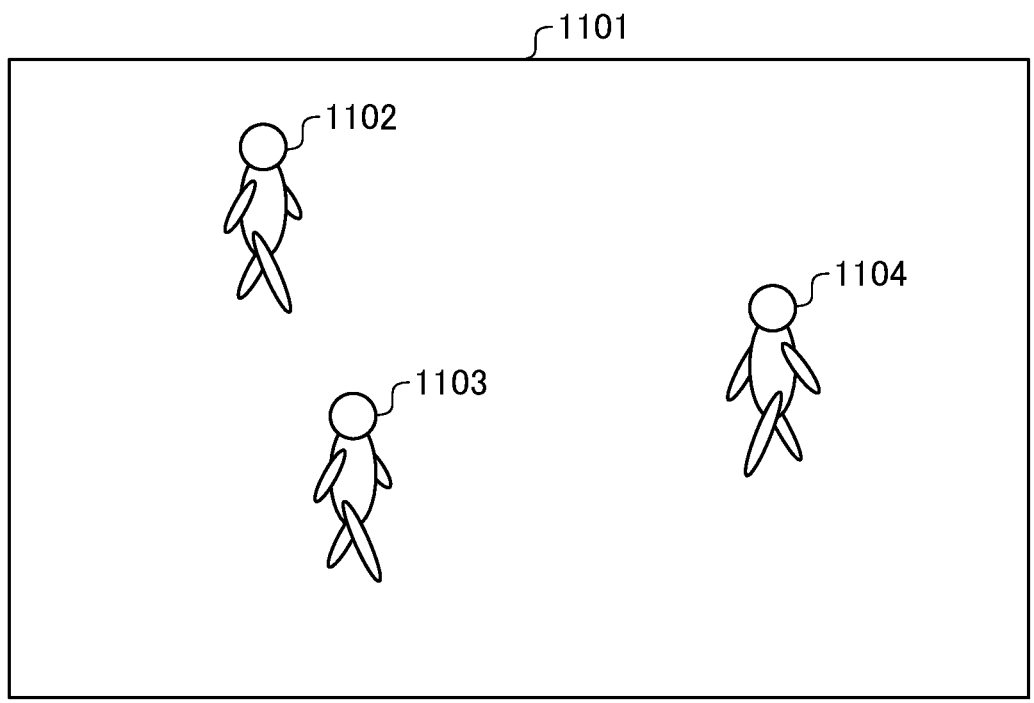
FIG. 11 is a diagram showing one example of a camera image inside a store.
Figure 12:
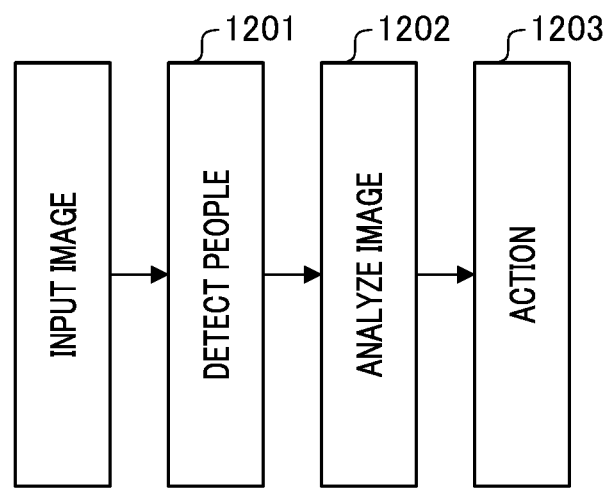
FIG. 12 is a diagram showing one example of processing for a general shoplifting prevention system.

During the pose estimation processing in the top-down system, these extracted images are input, and the positions of feature points such as the joint points, eyes, nose, and the like of each person are estimated. FIG. 10 shows one example of an input image and output information for the pose estimation processing. FIG. 10 is a diagram showing one example of pose estimation processing results according to the present embodiment.

The image 1001 is a person detection region that has been extracted from an original image. The results of performing pose estimation processing on this image 1001 are the coordinate point groups 1002 for each joint. In the present embodiment, an example is shown in which the coordinates for the shoulders, elbows, wrists, back, knees, ankles, nose, and eyes are detected. However, the pose estimation method is not limited thereto, and the application of a well-known technique is possible.

Next, during the behavior detection processing in step S306 of FIG. 3, the image analysis unit 104 performs suspicious (abnormal) behavior detection for whether or not the person who is the subject is performing a suspicious action based on the results of the pose estimation processing. In this context, step S306 functions as a behavior detection step (a behavior detection unit) configured to detect a person's behavior.

As a suspicious action, for example, a person who is paying more attention than necessary to and surveying their surroundings is determined to be a suspicious person. In this case, the orientation of the person and their head are detected from the pose estimation processing results, the state of turning their head is estimated based on changes in this orientation, and a person who has turned their head more than a predetermined number of times is made a suspicious person.

In addition, it is also possible to detect a person who is squatting down as a suspicious person based on coordinate changes in the lower half of their body. Furthermore, it is also possible to detect the extension and retraction of an arm based on coordinate changes for the elbow and wrist, to detect whether or not a product has been picked up, and then to determine whether or not this is suspicious in combination with other movement determination results.

In this manner, various definitions are possible for suspicious movements, and these are not limited by the above-explained method. In particular, in the case in which whether or not a subject is ill is detected, it is possible to define characteristic movements of that disease, or the like as a suspicious (abnormal) action.

In the case in which a person who is performing a suspicious action is detected by a predetermined behavior having been detected by processing such as that explained above, in step S307, the image analysis unit 104 generates a warning from the warning device 109 via the warning command unit 105 (warning command unit) shown in FIG. 1. In addition, in accordance with this, storage is performed to an external server via the network interface 206, and the network 211.

In addition, after the warning is generated and recording on an external server is performed, it is possible to release the calculation resources that were being used to analyze this person by, for example, halting at least one of the pose estimation or the behavior detection for this person for a predetermined period of time.

That is, after the warning is generated and recording to an external server is performed for a person for whom, for example, a predetermined behavior has been detected, the processing may also be made such that at least the detection operations for behavior are temporarily halted for this person. Conversely, the processing may also be made such that the degree of importance is lowered for a predetermined period of time.

In this case, the processing may also be made such that the IDs of the people for whom warnings were generated are made into a list and saved, and when the pose estimation subject determination processing in step S304 is performed, this list is referenced, and additional control is performed such that this subject is not made a pose estimation subject for just a predetermined period of time. After the processing in step S307, the processing returns to step S300 until the image analysis mode for the image processing apparatus is turned off, and the processing for the above-described steps S300 to S307 is repeated.

As was described above, even in the case in which a large number of people (subjects) who have been detected in the image are present, it is possible to lighten the processing load for the image analysis unit by limiting the subjects for the pose estimation processing to only a predetermined number of people based on the order of priority.

In particular, the calculation amount for the image analysis is kept at or below a fixed level regardless of the number of people (subjects) who are present in the image, and therefore, this is favorable in the case in which processing in real time using a low-cost, generic PC is necessary.

Note that in the present embodiment, the processing is made such that predetermined image processing such as pose estimation, behavior detection, display processing, and the like is not performed for people with a low degree of priority who have exceeded the upper limit for the number of people. However, the processing may also be made such that the image processing speed is reduced, or the image processing cycle is extended without completely halting this predetermined image processing.

Conversely, the processing may also be made such that with respect to the people who have high degrees of priority within the upper limit for the number of people, the image processing speed is raised, or the image processing cycle is shortened when predetermined image processing such as pose estimation, behavior detection, display processing, and the like is performed.

Note that in the above-described example, although the residence time is defined as the time during which a person continues to be uninterruptedly present in the image, this may also be defined as, for example, the inverse number of the displacement speed. In this case, it is sufficient if the displacement state of a person is measured, and pose estimation, behavior detection, and the like are performed by raising the order of priority for people with a slow displacement speed.

In addition, although in the above-described example, people are used as subjects, as was explained above, the present invention is not limited to image processing related to people. The subjects may also be, for example, living beings such as animals or the like, or, for example, they may also be parts, products, and the like in a production line or the like.

In the case in which living beings such as animals or the like are made the subjects, it is possible to, for example, efficiently detect animals who are exhibiting symptoms of illness, or the like. In the case in which this is applied to a manufactured product or the like, it is possible to efficiently perform checks of subjects such as parts, products, or the like, that are functioning abnormally.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing through a network or various storage media. Then, a computer (or a CPU, an MPU, or the like) of the image processing apparatus may be configured to read and execute the program. In such a case, the program and the storage medium storing the program configure the present invention.

This application claims the benefit of Japanese Patent Application No. 2022-019591 filed on Feb. 10, 2022, which is hereby incorporated by reference herein in its entirety.

What is claimed is:

1. An image processing apparatus comprising:
   at least one processor or circuit configured to function so as to perform:
   (1) detecting a plurality of subjects from an image that has been captured;
   (2) detecting an independent subject from among the plurality of subjects that have been detected, wherein the independent subject includes a subject for which other subjects are not present in a predetermined range of the subject;
   (3) measuring a residence time of the plurality of subjects that have been detected;
   (4) determining a degree of priority for the plurality of subjects that have been detected such that the degree of priority becomes higher for a subject that is independent and that has a relatively longer residence time, based on (a) results of a detection in the independent subject detecting, and (b) measurement results that have been measured in the residence time measuring;
   (5) performing predetermined image processing on the plurality of subjects up to a predetermined upper limit for a number of subjects in order from those with a higher degree of priority, wherein the predetermined image processing includes pose estimation processing that estimates poses for the plurality of subjects; and
   (6) causing a warning to be generated in a case in which a predetermined behavior has been detected, and halting at least a part of the predetermined image processing for a subject that triggered the warning after the warning is generated.

2. The image processing apparatus according to claim 1, wherein the at least one processor or circuit is configured to further function so as to:
   determine the degree of priority such that the degree of priority becomes higher for the independent subject that has been detected than for subjects that are not independent;
   determine the degree of priority such that, from among independent subjects that have been detected in the independent subject detecting, the degree of priority becomes higher for independent subjects with relatively longer residence times; and
   determine the degree of priority such that the degree of priority becomes higher for subjects with relatively longer residence times from among the subjects that are not independent.

3. The image processing apparatus according to claim 1, wherein the predetermined image processing further includes display processing for displaying the plurality of subjects up until the predetermined upper limit for the number of subjects in order from those with a higher degree of priority by differentiating them from other subjects.

4. The image processing apparatus according to claim 3, wherein a predetermined frame is displayed by the display processing for the plurality of subjects up until the predetermined upper limit for the number of subjects in order from those with a higher degree of priority.

5. The image processing apparatus according to claim 1, wherein whether or not a subject of the plurality of subjects is independent is detected.

6. The image processing apparatus according to claim 1, wherein subjects that are present in a predetermined range of coordinates, or that are closer thereto, are detected as independent subjects.

7. The image processing apparatus according to claim 1, wherein the predetermined image processing on the subjects is performed until the predetermined upper limit for the number of subjects in the order of those with a higher degree of priority for just a predetermined time.

8. The image processing apparatus according to claim 1, wherein a new degree of priority is determined by referencing a history of past degrees of priority.

9. The image processing apparatus according to claim 1, wherein the degree of priority is made higher for subjects for which a predetermined behavior has been detected.

10. The image processing apparatus according to claim 1, wherein at least behavior detection operations are halted for a predetermined time for subjects for which the predetermined behavior has been detected.

11. The image processing apparatus according to claim 1, wherein the plurality of subjects include people.

12. An image processing method comprising the following processes:
   a subject detection step that detects a plurality of subjects from an image that has been captured;
   an independence detection step that detects an independent subject from among the plurality of subjects that have been detected by the subject detection step, wherein the independent subject includes a subject for which other subjects are not present in a predetermined range of the subject;
   a measurement step that measures a residence time of the plurality of subjects that have been detected by the subject detection step;
   a determination step that determines a degree of priority for the plurality of subjects such that the degree of priority becomes higher for a subject that is independent and that has a relatively longer residence time, based on (a) results of a detection by the independence detection step, and (b) measurement results that have been measured by the measurement step;
   an image processing step that performs predetermined image processing on the subjects up to a predetermined upper limit for a number of subjects in order from those for with a higher degree of priority, wherein the predetermined image processing includes pose estimation processing that estimates poses for the plurality of subjects; and
   a causing step that causes a warning to be generated in a case in which a predetermined behavior has been detected, and that halts at least a part of the predetermined image processing for a subject that triggered the warning after the warning is generated.

13. A non-transitory computer-readable storage medium configured to store a computer program comprising instructions for executing a method, the method comprising the following processes:
   a subject detection step that detects a plurality of subjects from an image that has been captured;
   an independence detection step that detects an independent subject from among the plurality of subjects that have been detected by the subject detection step, wherein the independent subject includes a subject for which other subjects are not present in a predetermined range of the subject;
   a measurement step that measures a residence time of the plurality of subjects that have been detected by the subject detection step;
   a measurement step that measures a residence time of the plurality of subjects that have been detected by the subject detection step;
   a determination step that determines a degree of priority for the plurality of subjects such that the degree of priority becomes higher for a subject that is independent and that has a relatively longer residence time, based on (a) results of a detection by the independence detection step, and (b) measurement results that have been measured by the measurement step;
an image processing step that performs predetermined image processing on the subjects up to a predetermined upper limit for a number of subjects in order from those for with a higher degree of priority, wherein the predetermined image processing includes pose estimation processing that estimates poses for the plurality of subjects; and
a causing step that causes a warning to be generated in a case in which a predetermined behavior has been detected, and that halts at least a part of the predetermined image processing for a subject that triggered the warning after the warning is generated.

* * * * *